April 9, 1929.  A. P. DOUGHERTY  1,708,085
ICE MAKING APPARATUS
Original Filed Nov. 5, 1923  2 Sheets-Sheet 1
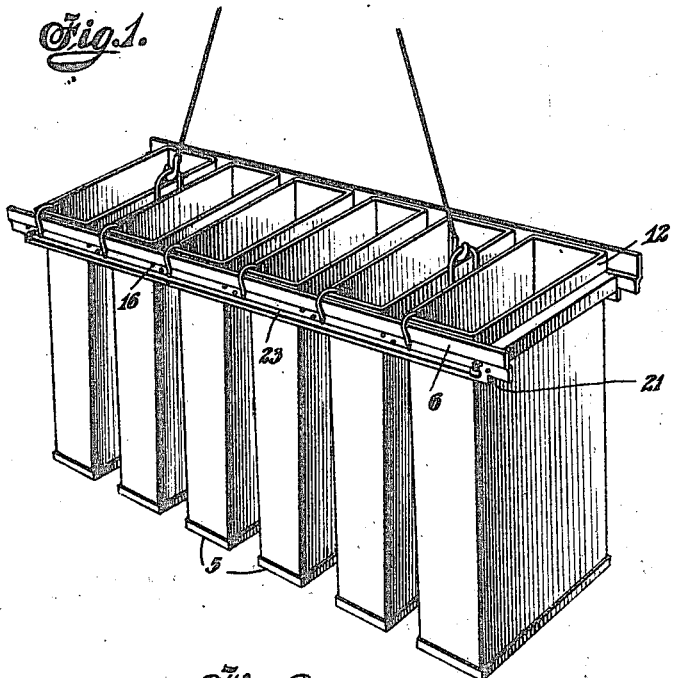
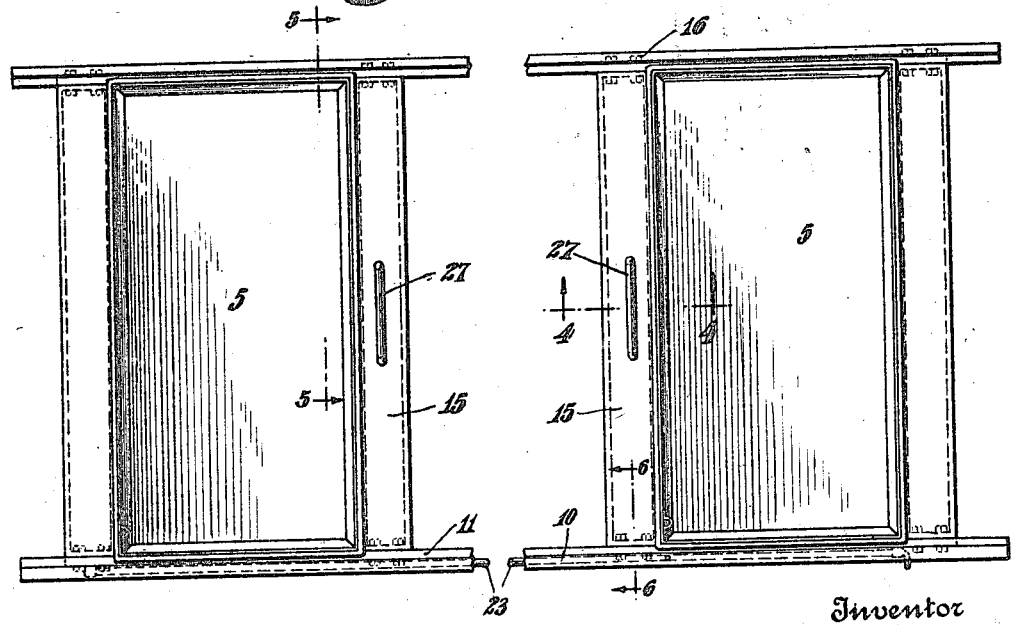
Inventor
Agustus P. Dougherty
By his Attorneys

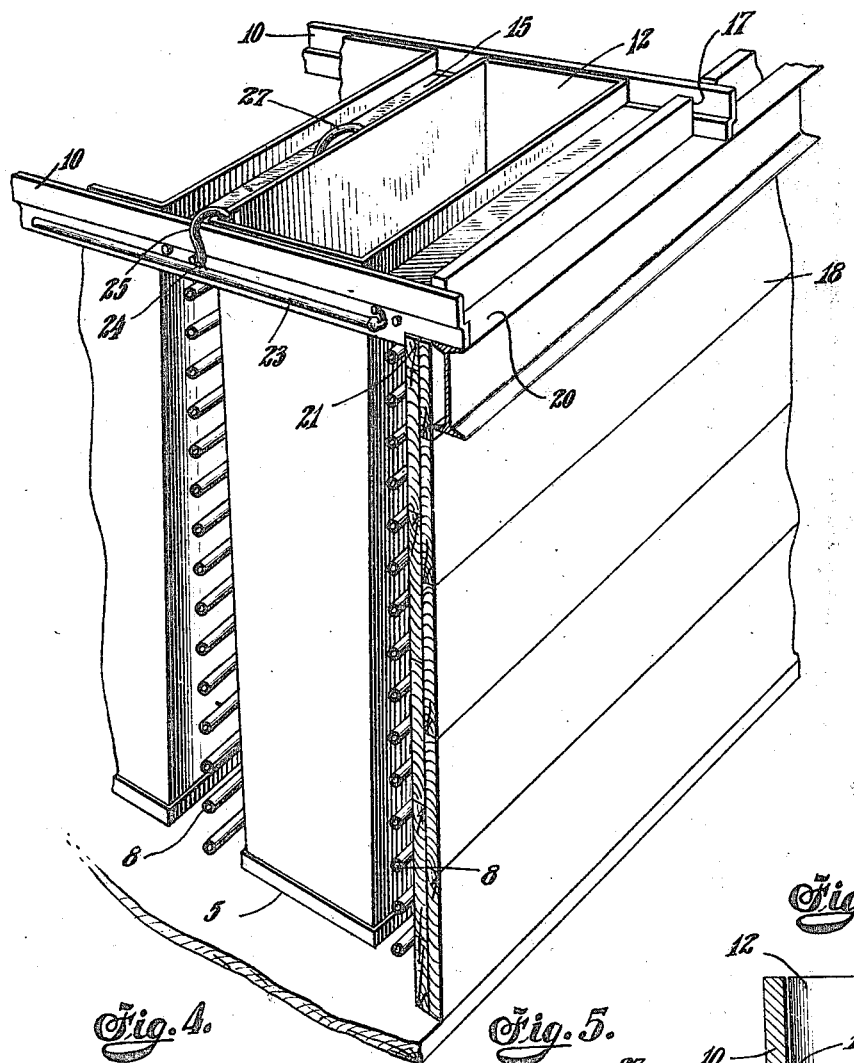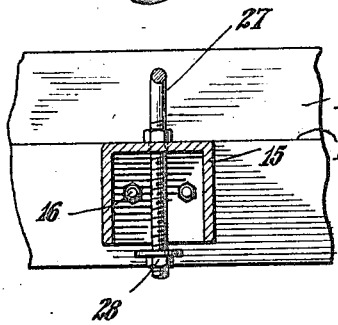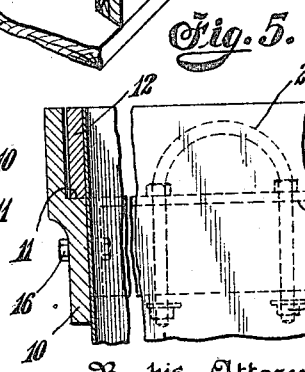

Patented Apr. 9, 1929.

1,708,085

UNITED STATES PATENT OFFICE.

AUGUSTUS P. DOUGHERTY, OF WARREN, OHIO, ASSIGNOR TO OHIO GALVANIZING & MANUFACTURING COMPANY, OF NILES, OHIO, A CORPORATION OF OHIO.

ICE-MAKING APPARATUS.

Application filed November 5, 1923, Serial No. 672,724. Renewed April 23, 1928.

The present invention relates to apparatus for use in the manufacture of ice and has for an object to provide improved arrangements whereby the freezing cans can be handled expeditiously in harvesting the ice and in introducing into the freezing bath cans of fresh water to be frozen.

According to the prevailing practice in ice making plants of the type with which the invention is more particularly concerned, freezing cans filled with fresh water are immersed in a freezing brine until the complete ice cake is formed whereupon they are removed from the brine, dipped in warm water to loosen the ice, inverted to discharge the ice cake, and then returned to the brine and refilled. The cans as commonly constructed, are each provided with means for the attachment of lifting devices and must be handled either entirely individually or through separate connections to the lifting crane.

In order to effect economy of labor in the harvesting operations it has been proposed to provide devices whereby a number of cans can be connected to a single crane simultaneously to be removed and transported together. Such expedients, however, have been only partially successful and have involved considerable manipulation of the devices employed, it being necessary to connect each can to its respective connection.

The present invention, in its preferred form, makes provision for expeditiously lifting a number of freezing cans at one time in such manner that a group of cans, as a unit, can be removed from the brine tank, transported, dipped in warm water to free the ice and inverted to discharge the ice cakes, the arrangement being such preferably that the connection to the crane is made once for all and the cans being relatively rigidly connected to each other so that no manipulation of individual cans as distinguished from manipulation of the group unit is necessary.

The number of cans which may be advantageously connected in one unit may vary with local conditions. If an unduly large number of cans are handled together, the consequent introduction of so many cans of fresh and relatively warm water into the tank at one time raises the temperature of the brine to such an extent as to decrease the efficiency of all the brine affected, whereas if the cans are changed a few at a time, the temperature of the brine is not affected to so great an extent and better efficiency is maintained. I find it convenient and conducive to expeditious handling of the cans and to economical operation of the plant to arrange the apparatus so that from six to twelve cans can be handled as a unit, the exact number depending upon the size of the brine tank and other local conditions.

The invention is susceptible of embodiment in a variety of mechanical structures, one of which for the purpose of illustration will be particularly described herein but it is to be understood that this description is given for the purpose of illustration only and is not to be construed as defining the limits of the invention.

Referring to the drawings,

Figure 1 is a perspective view of an apparatus constructed in accordance with the principles of the invention, Figure 2 is a plane view of the same, a part being broken away.

Figure 3 is a perspective view of an end portion of the carrier-frame and freezing cans supported therein, showing the position of the same with relation to the freezing tank.

Figures 4, 5, and 6 are detailed sectional views taken respectively at the lines 4—4, 5—5, and 6—6 of Figure 2.

Referring more particularly to the apparatus shown in the drawing, a number of freezing cans 5 are so connected that they can be handled as a unit during the operations incident to the freezing and harvesting of the ice. The connecting means shown consists of a carrier-frame 6 in which cans 5 of any suitable design, such for example as the can shown in the patent to Bentley #1,437,165 dated November 28, 1922 can be removably or permanently secured. In the particular structure shown, they are retained by frictional engagement with the frame in which they fit with sufficient snugness to prevent displacement during the ordinary use of the apparatus. By this arrangement, an individual can may be removed and replaced as occasion may require.

The construction of the carrier-frame may vary in accordance with the requirements of the freezing tank or of the particular cans in use, as desired.

The apparatus shown is designed for use in a freezing tank having freezing coils between the successive cans as indicated at 8 in Figure 3. The carrier-frame accordingly properly spaces the cans and is so constructed that it will clear these coils when it, with the supported cans is lowered into place in the freezing tank. As shown, the side bars 10 of the frame are of rolled steel of a cross section shown in Figure 6 to provide inwardly directed shoulders 11 on which the reinforcing metal band 12 at the top of the freezing can rests. The cross bars 15 of the frame may also, if desired, be so formed as to support the cans by engaging beneath the reinforcing band 12. In the structure shown the cross members 15 are of inverted channel form with end portions which may be readily bolted to the side bars by suitable bolts 16 or the apparatus may be permanently riveted together if desired.

The side bars 10 of the frame 6 are extended at both ends a sufficient distance to provide for resting the same on suitable supports. As shown they extend at each end through slots 17 in the wall 18 of the freezing tank and rest upon an I-beam 20 provided for this purpose. It will be noted that the depth of the carrier-frame is relatively small and therefore causes no substantial loss of freezing space within the tank. The side bars may be recessed on their lower edges where they extend over the walls of the tank as indicated at 21 in Figure 3.

Provision is made for supplying air to the several cans, as is common in the so-called raw water system of manufacturing ice, to prevent impurities in the water being frozen into the ice cake. As shown an air tube 23 may be secured to and extended along one side bar of the frame. This tube is provided with connections 24 for receiving individual flexible tubes 25 which connect with the air tubes formed in the several cans. The flexible connecting tubes 25 overlie the cross bars of the carrier-frame and can be so arranged that they will not interfere with the discharge of the ice cake from the can or be broken or disconnected thereby.

The described arrangement permits the number of cans handled as a unit to be filled with water at a suitable filling station where arrangements can be made for expeditiously filling all cans simultaneously in a minimum of time. The cans so filled can then be returned to the freezing tank.

The carrier-frame may be provided with any suitable means for the attachment of lifting devices. As shown in Figure 5, U-shaped handles 27, are secured in suitably selected cross bars 15 for this purpose. The number and location of the handles will depend upon the number, arrangement and weight of the cans carried in the frame. The handles are shown as vertically movable in order that they may lie below the level of the tops of the freezing cans when not in use and may be lifted to provide ample room for lifting hooks thereunder when the cans are to be raised. Suitable nuts 28 limit the upward movement of the handles.

The frames may be galvanized to prevent rusting if desired.

What I claim is:

1. In apparatus for making ice, a portable structure constructed and arranged to be handled as a unit for transporting ice formed therein, comprising a carrier frame having parallel side bars presenting opposed shoulders to receive a plurality of freezing cans with their top reinforcing bands resting upon the shoulders and transverse spacer bars connecting the side bars and arranged also to provide support for the freezing cans, the shoulders being spaced from the tops of the side bars a distance equal to the depth of the reinforcing bands of the freezing cans whereby the carrier frame extends to the tops of the cans.

2. In apparatus for making ice, a portable structure constructed and arranged to be handled as a unit for transporting ice to be formed therein, comprising a carrier frame having parallel side bars presenting opposed shoulders to receive a plurality of freezing cans with their top reinforcing bands resting upon the shoulders and transverse spacer bars connecting the side bars, the side bars and transverse spacer bars being formed and arranged to provide continuous support around the four sides of each freezing can, two of said transverse bars being provided with means for the attachment of a lifting crane.

3. In apparatus for use in making ice, a structure constructed and arranged to be handled as a unit comprising a shallow carrier-frame and a plurality of freezing cans removably carried thereby and engaging the frame at their top portions only, the carrier-frame comprising parallel side members and cross members connecting the side members, the cans having outstanding flanges engaging the cross members to provide support for the cans, the relative arrangement of the side members and cross bars and of the flanges on the cans being such that the side members extend to the tops of the cans and the spaces between the cans except at the tops of the cans are left free and open whereby the cans can be lowered into a brine tank with freezing coils positioned between the cans.

4. An apparatus for use in making ice constructed and arranged to be handled as a unit, comprising a carrier-frame having side bars of a cross section adapted to be rolled to provide shoulders substantially midway of the depth of the bars and cross members secured to the side bars with their upper edges even with the shoulders of the side bars to provide continuous can supports together with freezing cans fitting between the side bars and cross members with their top reinforcing bands engaging the shoulders of the side bars and the tops of the cross members, and the tops of the cans being substantially even with the upper edges of the side bars, said carrier-frames being of relatively shallow depth whereby the space between the cans is left open substantially to the tops thereof, substantially as described.

In testimony whereof, I have signed my name to this specification this 31st day of October, 1923.

AUGUSTUS P. DOUGHERTY.